United States Patent
Himmelstoss et al.

(10) Patent No.: US 8,847,814 B2
(45) Date of Patent: Sep. 30, 2014

(54) FMCW RADAR SENSOR FOR MOTOR VEHICLES

(75) Inventors: Armin Himmelstoss, Weissach Im Tal (DE); Joachim Hauk, Renningen-Malmsheim (DE); Elisabeth Hauk, legal representative, Renningen-Malmsheim (DE); Rahel Hauk, legal representative, Renningen-Malmsheim (DE); Manuel Hauk, legal representative, Renningen-Malmsheim (DE); Thomas Walter, Renningen (DE); Thomas Schneider, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 408 days.

(21) Appl. No.: 13/139,265

(22) PCT Filed: Oct. 20, 2009

(86) PCT No.: PCT/EP2009/063701
§ 371 (c)(1), (2), (4) Date: Aug. 22, 2011

(87) PCT Pub. No.: WO2010/066495
PCT Pub. Date: Jun. 17, 2010

(65) Prior Publication Data
US 2011/0304500 A1 Dec. 15, 2011

(30) Foreign Application Priority Data
Dec. 12, 2008 (DE) .......................... 10 2008 054 570

(51) Int. Cl.
G01S 13/93 (2006.01)
G01S 7/03 (2006.01)
G01S 7/35 (2006.01)
G01S 13/34 (2006.01)

(52) U.S. Cl.
CPC ............... *G01S 13/34* (2013.01); *G01S 13/931* (2013.01); *G01S 7/032* (2013.01); *G01S 7/35* (2013.01); *G01S 7/03* (2013.01)
USPC .............................................. 342/70; 342/175

(58) Field of Classification Search
CPC ...... G01S 13/931; G01S 7/032; G01S 7/4056
USPC .............................. 342/61, 70, 175, 200, 372
See application file for complete search history.

(56) References Cited

U.S. PATENT DOCUMENTS 5,481,268 A * 1/1996 Higgins .......................... 342/70
5,724,042 A * 3/1998 Komatsu et al. .............. 342/175

(Continued)

FOREIGN PATENT DOCUMENTS

| DE | 10 2004 051276 | 1/2006 |
|---|---|---|
| JP | 2006-250751 | 9/2006 |
| JP | 2006-275776 | 10/2006 |

OTHER PUBLICATIONS

International Search Report for PCT/EP2009/063701, dated Mar. 8, 2010.

*Primary Examiner* — John B Sotomayor
*Assistant Examiner* — Marcus Windrich
(74) *Attorney, Agent, or Firm* — Kenyon & Kenyon LLP

(57) ABSTRACT

An FMCW radar sensor for motor vehicles, having a high frequency part for generating, transmitting and receiving radar signals, a modulation device for controlling the frequency modulation of the transmitted radar signal, at least one analog preprocessing stage for an intermediate frequency signal formed from the received radar signal, at least one analog/digital transducer stage, and a processor for controlling the modulation device and for further processing the digital signals of the analog/digital transducer stage, wherein the modulation device, the preprocessing stage and the analog/digital transducer stage are integrated into a single semiconductor component, which also has a monitoring device and registers for the configuration and monitoring of the components of the semiconductor component as well as an interface to the processor.

4 Claims, 2 Drawing Sheets

(56) References Cited

U.S. PATENT DOCUMENTS

| | | | |
|---|---|---|---|
| 6,130,640 A * | 10/2000 | Uematsu et al. | 342/175 |
| 6,400,308 B1 * | 6/2002 | Bell et al. | 342/71 |
| 6,583,753 B1 * | 6/2003 | Reed | 342/70 |
| 6,972,709 B1 * | 12/2005 | Deem et al. | 342/70 |
| 7,496,158 B2 * | 2/2009 | Fudge et al. | 375/340 |
| 7,567,206 B1 * | 7/2009 | Schmidt et al. | 342/175 |
| 2003/0156060 A1 * | 8/2003 | Revankar et al. | 342/372 |
| 2005/0088336 A1 * | 4/2005 | Sakamoto et al. | 342/175 |
| 2005/0225481 A1 * | 10/2005 | Bonthron | 342/175 |

* cited by examiner

FMCW RADAR SENSOR FOR MOTOR VEHICLES

FIELD OF THE INVENTION

The present invention relates to an FMCW radar sensor for motor vehicles having a high frequency part for generating, transmitting and receiving radar signals, a modulation device for controlling the modulation of the transmitted radar signal, at least one analog preprocessing stage for an intermediate frequency signal formed from the received radar signal, at least one analog/digital transducer stage and a processor for activating the modulation device and for further processing the digital signals of the analog/digital transducer stage.

BACKGROUND INFORMATION

In an FMCW radar sensor (frequency modulated continuous wave), the radar signal is transmitted continuously, however, ramp modulated in its frequency. A radar sensor of this type is discussed in German patent document DE 10 2004 051 276, in which high frequency part and at least parts of the modulation device are integrated into a single semiconductor component, a so-called MMIC (monolithic microwave integrated circuit). The remaining components of the radar sensor are formed by separate analog and digital functional components, which are specially adapted to the construction and the method of operation, desired respectively, of the high frequency part.

In motor vehicles, such radar sensors are generally used in connection with driver assistance systems, for instance, for automatic ranging, for collision warning and the like. Since such systems are used not only for increasing driving comfort, but increasingly also take over safety-relevant functions, increasingly greater demands are made on the reliability of the systems, and accordingly also on the reliability of the radar sensor.

SUMMARY OF THE INVENTION

It is an object of the exemplary embodiments and/or exemplary methods of the present invention to create a compactly designed radar sensor, which is able to be controlled and monitored in a more simple and reliable manner.

This object is attained, according to the exemplary embodiments and/or exemplary methods of the present invention, in that the modulation device, the preprocessing stage and the analog/digital transducer stage are integrated into a single semiconductor component, which also has in it a monitoring device and registers for the configuration and monitoring of the components of the semiconductor component, as well as an interface to the processor.

Thus, the semiconductor component combines the essential digital and analog components that work below the high frequency band. One substantial advantage, besides the reduction in installation space, is above all that, because of the integrated type of construction, an essentially more intensive and more simple monitoring of the various functional components is made possible, as well as the deactivation independent of the tasks of the microprocessor, the susceptibility to failure and power loss are reduced and the electromagnetic compatibility (EMC) is improved. Various registers, which are also integrated into the semiconductor component make it possible, by an appropriate configuration, to adapt the semiconductor component to differently constructed and/or differently operating high frequency parts, so that a great degree of flexibility is achieved by the use of the semiconductor component. This makes it possible to manufacture the application-specific semiconductor component (ASIC) in comparatively large piece numbers, and thus economically.

Advantageous embodiments of and further refinements of the exemplary embodiments and/or exemplary methods of the present invention are described herein.

One substantial increase in flexibility is achieved by a sequencer being included in the component, using which one is able to program different sequences in time and modulation schemes for the measuring process. This permits "offline monitoring" and an unloading of the microprocessor (no interrupts or the like), so that a cost-effective processor may be used.

A standardized interface to the processor permits using a standard microcontroller as the processor.

In one advantageous specific embodiment, a clock frequency oscillator, or at least its electronic part, is also integrated into the semiconductor component, which provides a uniform clock frequency for all the functions of the semiconductor component as well as for the microcontroller.

An exemplary embodiment of the present invention is illustrated in the drawings and explained in greater detail in the following description.

DETAILED DESCRIPTION

Figure 1:
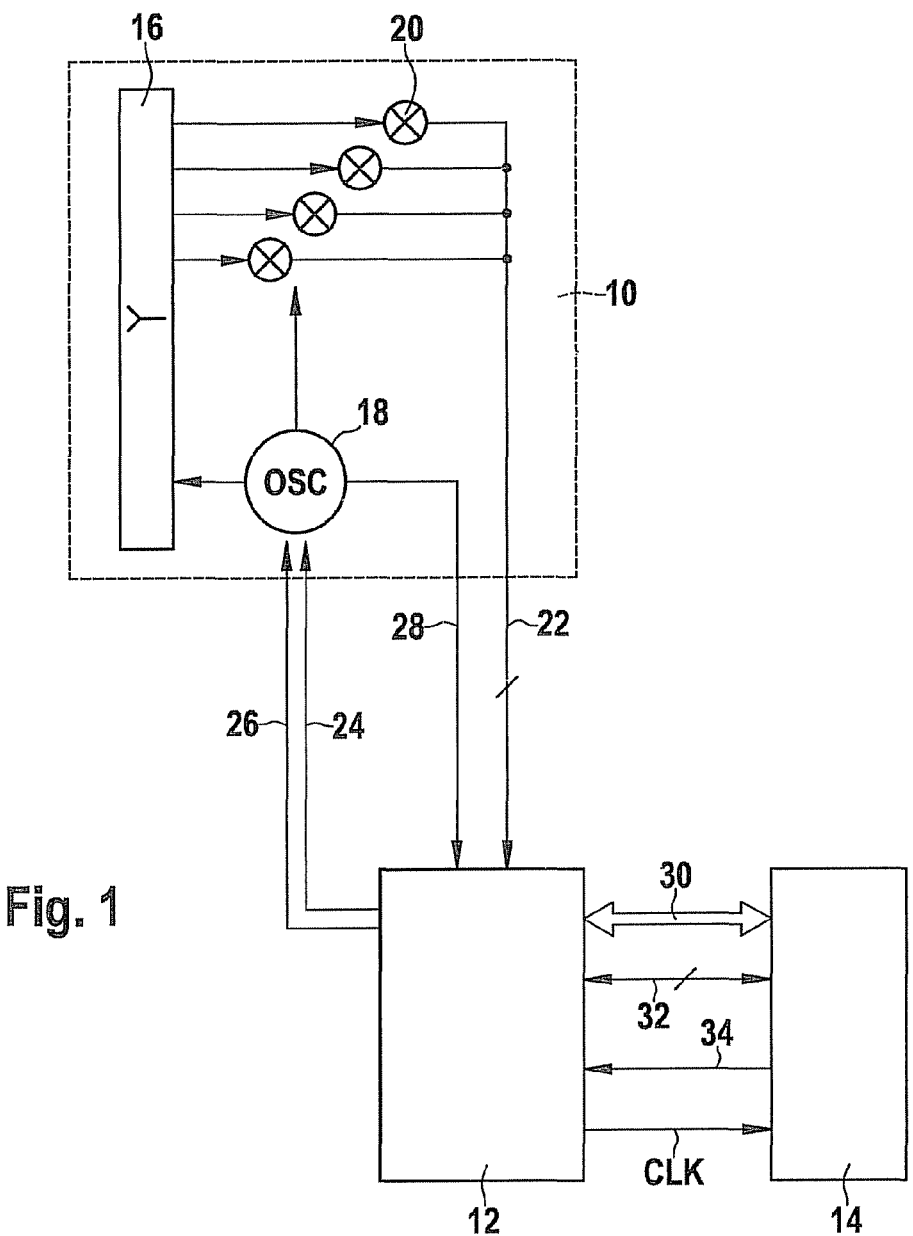
FIG. 1 shows a block diagram of a radar sensor block diagram according to the present invention.

The radar sensor shown in FIG. 1 includes a high frequency part 10, and integrated semiconductor component 12 for controlling the high frequency part and for preprocessing the received radar signal, as well as a processor 14 (for instance, a standard microcontroller), which transmits control commands and configuration commands to semiconductor component 12, and evaluates again the data preprocessed in this semiconductor component.

High frequency part 10 has the usual design for FMCW radars, and includes an antenna group 16 having a plurality of antenna patches (four, in the example shown), which are used in this instance both for transmitting the radar signal and for receiving the radar echo (monostatic antenna concept). The radar signal that is to be transmitted is generated by a voltage-controlled high frequency oscillator 18. The signals received by the individual antenna patches are mixed in mixers 20 with the signal of high frequency oscillator 18, so that intermediate frequency signals 22 are obtained, which are then transmitted on (four) parallel channels to semiconductor component 12.

Control lines 24 and 26 from semiconductor component 12 to high frequency oscillator 18 are used for controlling the amplitude modulation and for the frequency tuning and the frequency modulation of the oscillator. A feedback signal 28 supplied by high frequency oscillator 18 permits the regulation of the high frequency oscillator in a closed frequency loop (FFL) or, in the example under discussion, a closed phased loop (PLL).

Semiconductor component 12 communicates with processor 14 via a digital data bus 30, such as a 16 bit bus, and via synchronization lines and address lines 32, and, in addition, it is in a position to receive a reset command from processor 14 on a line 34. In reverse, semiconductor component 12 supplies to processor 14 a clock pulse signal CLK, for instance, having a frequency of 40 MHz.

Figure 2:
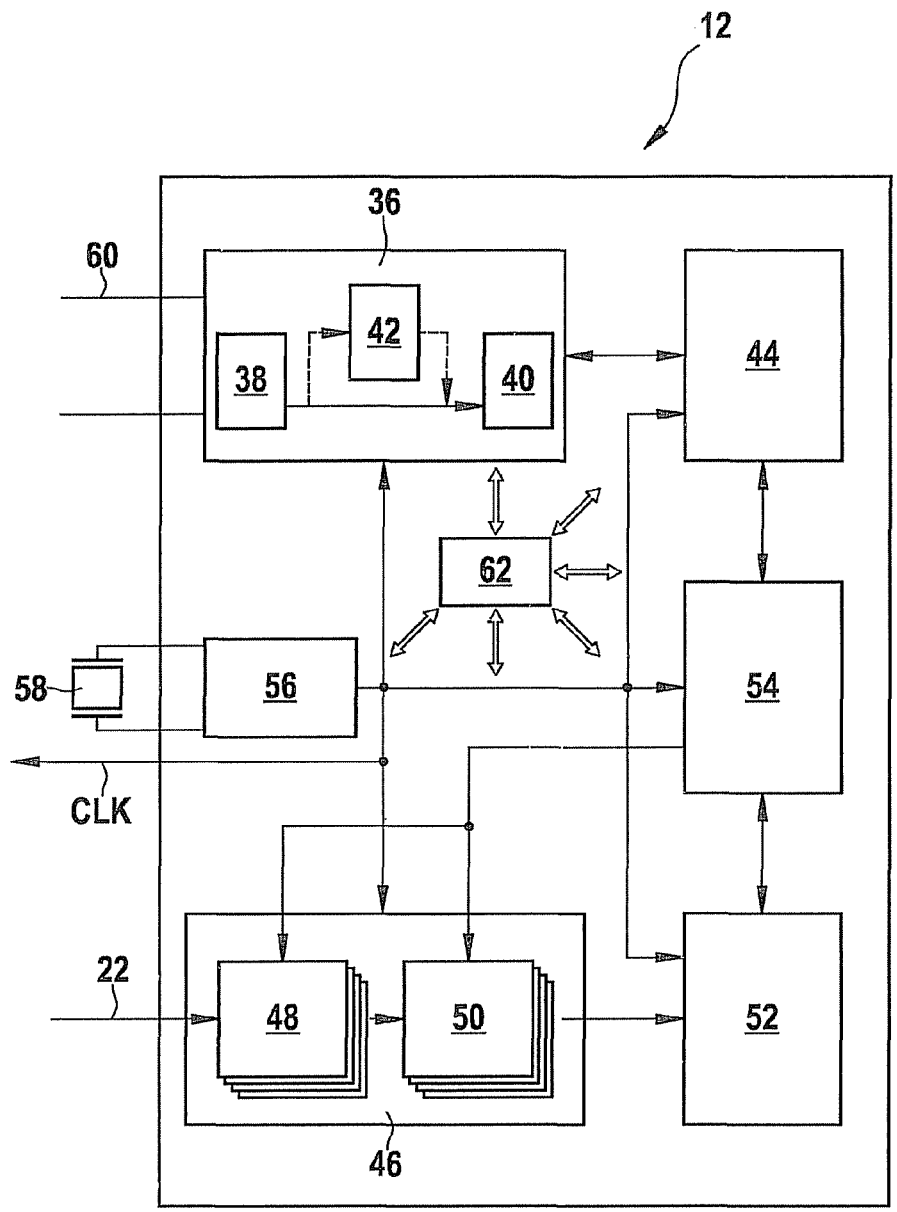
FIG. 2 shows a block diagram of an integrated semiconductor component of the radar sensor as in FIG. 1.

The layout of the semiconductor component 12 is depicted in greater detail in FIG. 2.

One essential analogous functional group of the semiconductor component is a modulation device 36 for frequency modulation and frequency tuning of high frequency oscillator 18. In the example shown, this modulation device includes a base closed phase loop (FM-PLL) 38 which works at a frequency of 2 GHz, for example, and an additional closed phase loop 40 (MMIC-PLL), which is used to regulate the high frequency part (MMIC), on the basis of the signal of the base closed phase loop, whose working frequency band is approximately 76 GHz. With the aid of these components, the frequency of high frequency oscillator 18 is modulated, for instance, in temporally successive rising and falling ramps.

Modulation device 36 also includes an additional closed phase loop 42, which may be interconnected if necessary, in order to modify the swing or the position of the frequency ramps.

Modulation device 36 communicates with a register block 44, which includes various control registers and parameter registers for the control of modulation device 36, as well as error registers for functional monitoring.

For the processing of intermediate frequency signal 22 supplied by high frequency oscillator 18, semiconductor component 12 has a receiving path 46. A preprocessing stage 48 of this receiving path is made up of several blocks, which process the intermediate frequency signal 22 transmitted on the four channels channel by channel. These preprocessing blocks include particularly low-noise preamplifiers, modulation filters, anti-aliasing filters, offset compensators and the like. As is symbolically shown in FIG. 2, a plurality of these functional blocks is present, four in the example shown. However, there may be more of them, so that semiconductor component 12 may optionally also be used for high frequency parts having more than four channels.

An analog/digital transducer stage 50 of receiving path 46 is formed by ADC blocks and includes analog/digital transducers (e.g. sigma-delta ADC's), as well as variable decimators (scanners) and filters (e.g. FIR filters) for scanning and filtering the digitized signals. The number of the ADC blocks corresponds to the number of the preprocessing blocks.

The signals processed by the ADC blocks are output via a standardized interface 52 to processor 14 or are optionally stored temporarily in a data memory until retrieved by the processor.

Furthermore, semiconductor component 12 includes a sequencer 54, which communicates with interface 52 and with register block 44, and is able to be programmed (via processor 14) in such a way that it is able to control the process sequences for different methods of operation of the radar sensor. These methods of operation may differ, for example, in the type of frequency modulation and in the sequence and the repetition scheme of the modulation ramps. For example, besides an FMCW method of operation, a continuous method of operation (CW) as well as the functions step-FMCW or multiplex-FMCW are also programmable. In the same way, various amplitude modulations may be programmed, for instance, for global control of the transmitting power or for different pulse modulation patterns. The method of operation of preprocessing stage 48 and analog/digital transducer stage 50 is also controlled by sequencer 54, and is thereby adjusted to the sent modulation scheme in each case. In particular, the scanning pattern and the position of the scanning points are thereby also able to be varied during scanning the digital data flows.

For the temporal coordination of all these functions, semiconductor component 12 also includes a clock pulse signal oscillator 56, which supplies the various components of semiconductor component 12, as well as processor 14 with clock pulse signal CLK. Associated with this clock pulse signal oscillator 56 is also an externally connected quartz resonator 58, as frequency reference.

Modulation device 36 also has terminals 60 for external filter circuits.

Finally, an internal monitoring device 62 is integrated into semiconductor component 12, which is here shown as a separate block whose functions are implemented, however, distributed over the entire semiconductor component, so that the operating state and the flawless method of operation of all the functional components are able to be monitored, and possible errors may be recorded in the error registers of register block 44, and then reported via interface 52 to processor 14.

The invention claimed is:

1. An FMCW radar sensor for a motor vehicle, comprising:
a high frequency part for generating, transmitting and receiving radar signals;
a modulation device for controlling the modulation of the transmitted radar signal;
at least one analog preprocessing stage for an intermediate frequency signal formed from the received radar signal;
at least one analog/digital transducer stage; and
a processor for controlling the modulation device and for further processing the digital signals of the analog/digital transducer stage; and
a clock pulse signal generator;
wherein:
the modulation device, the preprocessing stage, the analog/digital transducer stage, and the clock pulse signal generator are integrated into a single semiconductor component that (a) is separate from the high frequency part, and (b) includes a monitoring device and registers for the configuration and monitoring of the components of the semiconductor component, and an interface to the processor; and
the clock pulse signal generator supplies a uniform clock pulse signal to the modulation device, the preprocessing stage, and the analog/digital transducer stage which are configured to use the received clock pulse signal to coordinate their respective functions.

2. The radar sensor of claim 1, wherein a programmable sequencer for the variable control of the working sequences of the modulation device and the analog/digital transducer stage is integrated into the semiconductor component.

3. The radar sensor of claim 1, wherein the clock pulse signal generator supplies the processor with the clock pulse signal.

4. The radar sensor of claim 1, wherein the semiconductor component is laid out for controlling different forms of at least one of frequency modulations and amplitude modulations.

* * * * *